Figure 1:
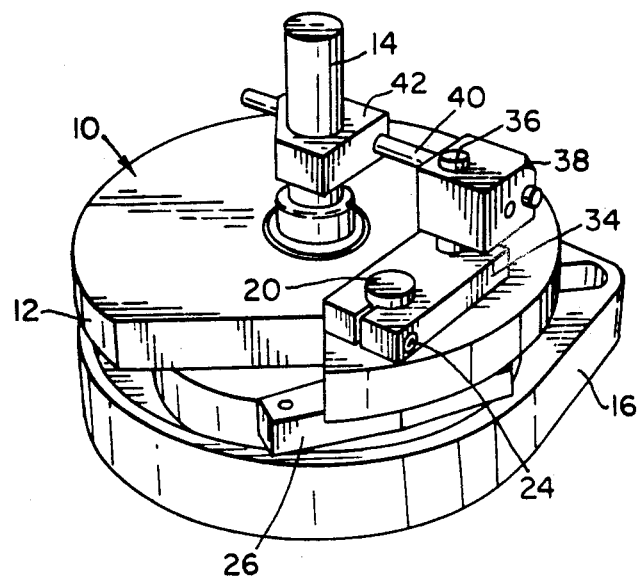

United States Patent [19]

Le Bras

[11] Patent Number: 4,625,575
[45] Date of Patent: Dec. 2, 1986

[54] CAM ASSEMBLY FOR A FEEDER MECHANISM

[75] Inventor: Philippe A. Le Bras, Chateauroux, France

[73] Assignee: The Mead Corporation, Dayton, Ohio

[21] Appl. No.: 797,297

[22] Filed: Nov. 13, 1985

[30] Foreign Application Priority Data

Nov. 13, 1984 [GB] United Kingdom ............... 8428644

[51] Int. Cl.⁴ ............................................. F16H 25/08
[52] U.S. Cl. ........................................ 74/63; 74/567;
74/569; 271/102
[58] Field of Search ............... 74/567, 569, 22 R, 63,
74/660, 393, 394; 271/102, 91, 99, 131, 132

[56] References Cited

U.S. PATENT DOCUMENTS

| | | | |
|---|---|---|---|
| 498,552 | 5/1893 | Hunt | 74/63 |
| 1,979,195 | 7/1933 | Salomon | 74/569 |
| 2,494,186 | 1/1950 | Magnusson | 271/102 |
| 3,181,860 | 5/1965 | Liebenow et al. | 271/102 |
| 3,536,570 | 10/1970 | Holstein | 271/102 |
| 3,575,409 | 4/1971 | Calvert | 271/102 |
| 3,835,717 | 9/1974 | Rudolph | 74/63 |
| 3,887,177 | 6/1975 | Farfaglia et al. | 271/102 |
| 3,994,490 | 11/1976 | Smiltneck | 271/102 |
| 4,069,724 | 1/1978 | Sobotta | 74/569 |
| 4,154,438 | 5/1979 | Seragnoli | 271/102 |

OTHER PUBLICATIONS

IBM Technical Disclosure Bulletin, "Paper Feed Apparatus" vol. 22, No. 4, Sep. 1979.

Primary Examiner—Gary L. Smith
Assistant Examiner—Carl M. DeFranco
Attorney, Agent, or Firm—Erwin Doerr

[57] ABSTRACT

A cam assembly (10) for a carton blank feeder mechanism comprises a cam plate (16) having formed therein a first continuous cam track (44) and a second relatively shallower cam track (46). A cam track follower arm (26) includes a first follower (30,32) for relative movement within only the first continuous cam track and a second follower (28) for relative movement within the first and second cam tracks. Drive means (12,14) are provided for moving the follower arm relative to the cam plate and article pickup means is connected to the cam arm by an eccentric arm (34). The first and second cam tracks includes arcuate portions (44c, 46d) engaged sequentially by respective ones of the first and second followers so that the article pickup means is caused to move to an outwardly extended position and to an inwardly retracted position, respectively, relative to a central axis of the cam plate.

6 Claims, 9 Drawing Figures

CAM ASSEMBLY FOR A FEEDER MECHANISM

This invention relates to a cam assembly for a feeder mechanism operable to withdraw an item such as a paperboard blank from a hopper and for moving and depositing the blank at a point of application or use.

Such cam assemblies and mechanisms are known, e.g. from U.S. Pat. No. 3,575,409. However, in comparison with such known constructions the present invention seeks to achieve a reduction in the number of components while at the same time providing a smoother rotational movement of the whole feeder mechanism and the opportunity of an increase in speed without undue vibration.

To this end, one aspect of the invention deals with the arrangement of the cam assembly for a feeder mechanism, which assembly comprises a cam plate having formed therein a first continuous cam track and a second relatively shallower cam track, cam track follower means including a first follower for relative movement within only said first continuous track, and a second follower for relative movement within the first and second cam tracks, drive means for moving said cam track followers with respect to said cam tracks, said cam track follower means being connected to article pickup means and each of said first and second cam tracks including arcuate portions engaged sequentially by respective ones of said first and second followers so that said article pickup means is caused to move to an outwardly extended position and to an inwardly retracted position, respectively, relative to a central axis of said cam plate.

Figure 2:
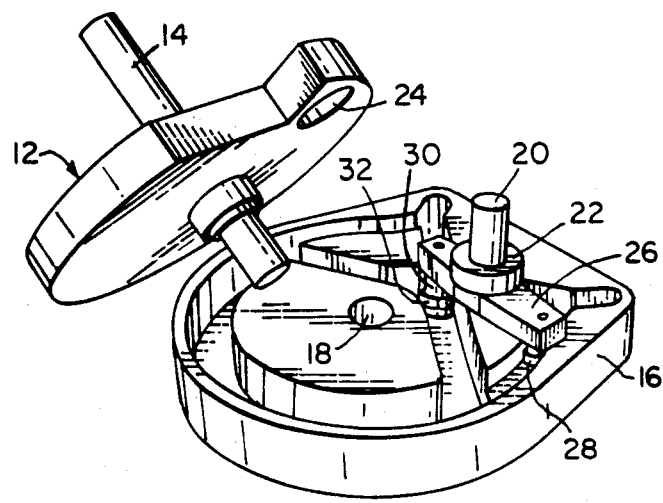
Figure 3:
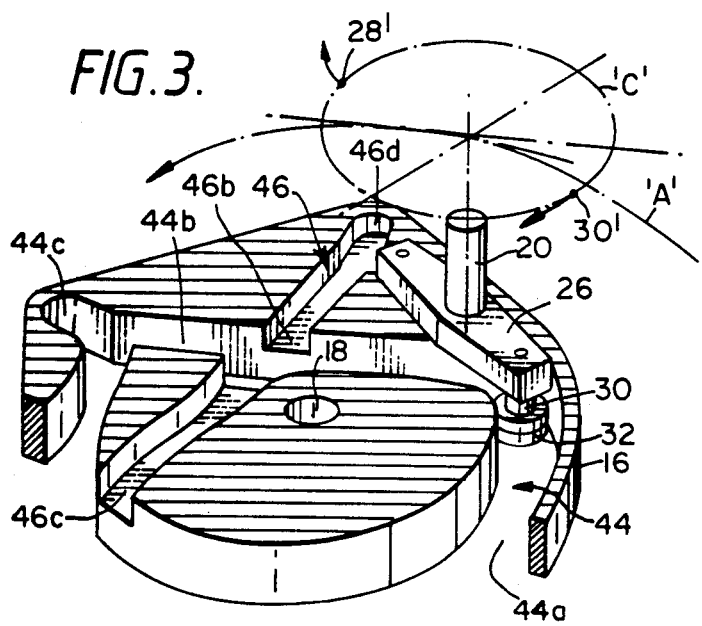
Figure 4:
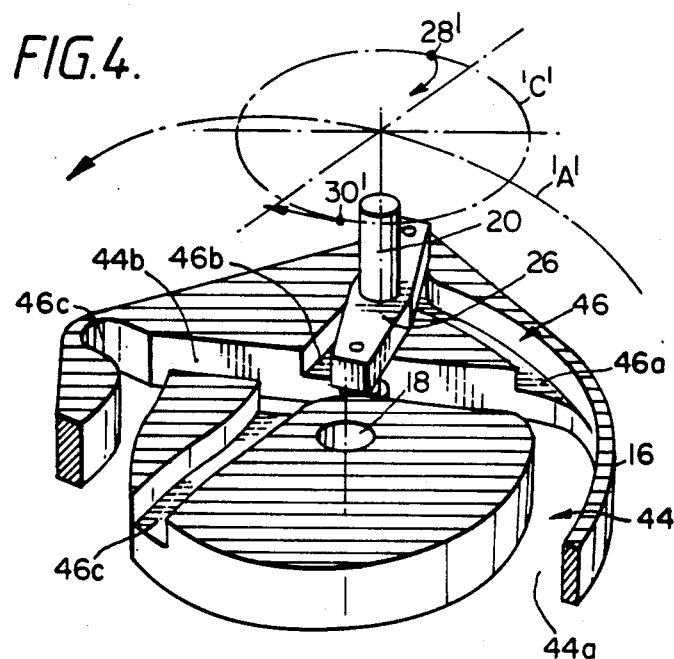
Figure 6:
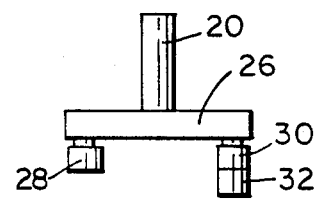
Figure 5:
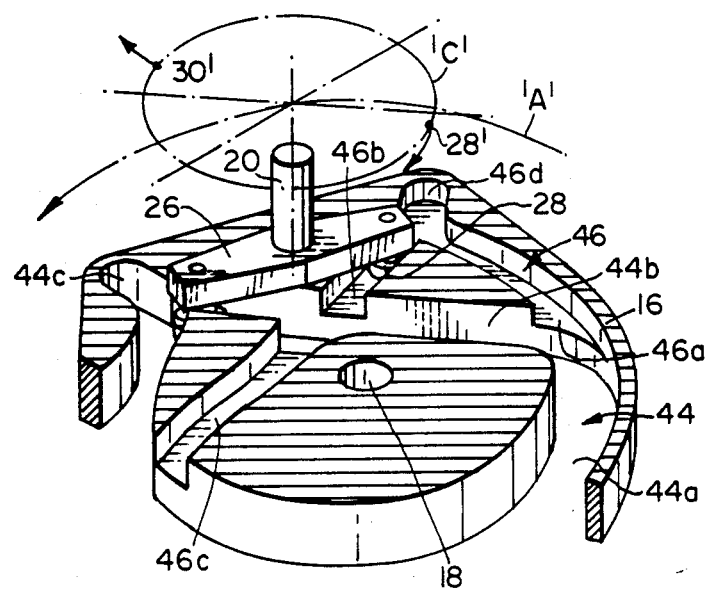
Figure 7:
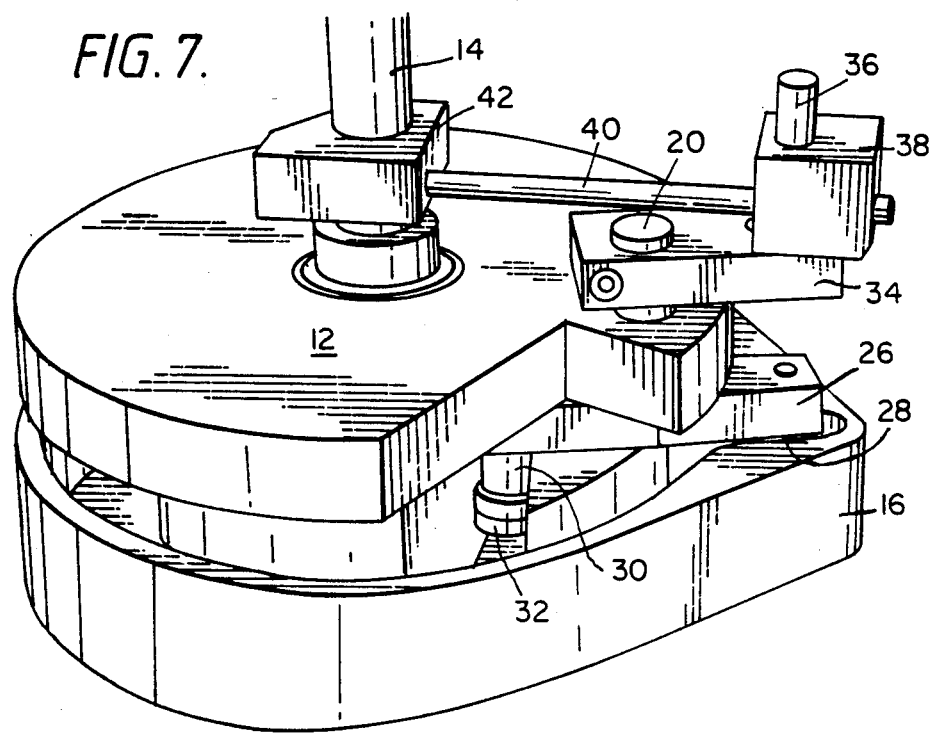
Figure 8:
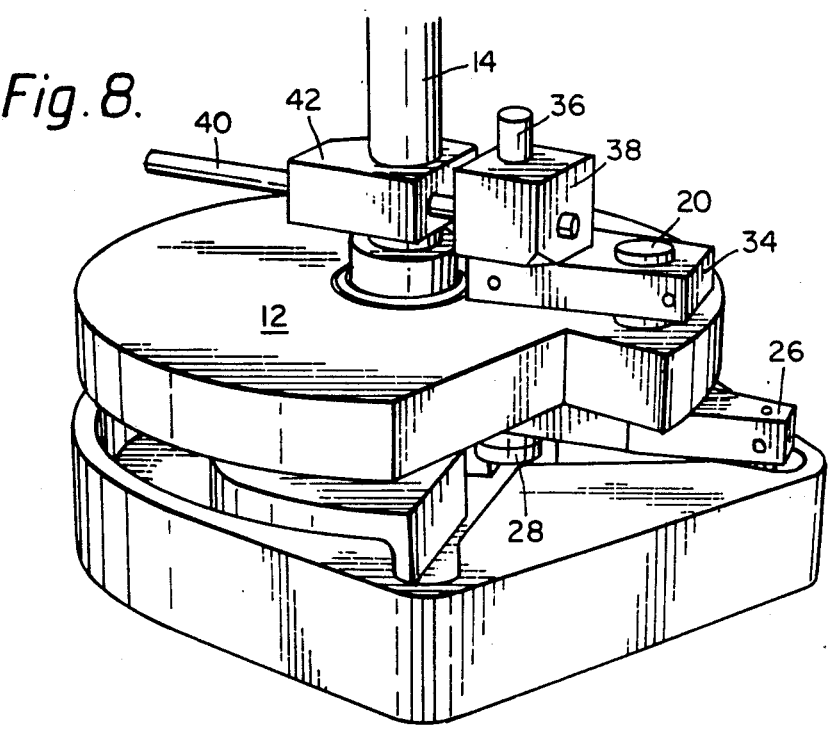
Figure 9:
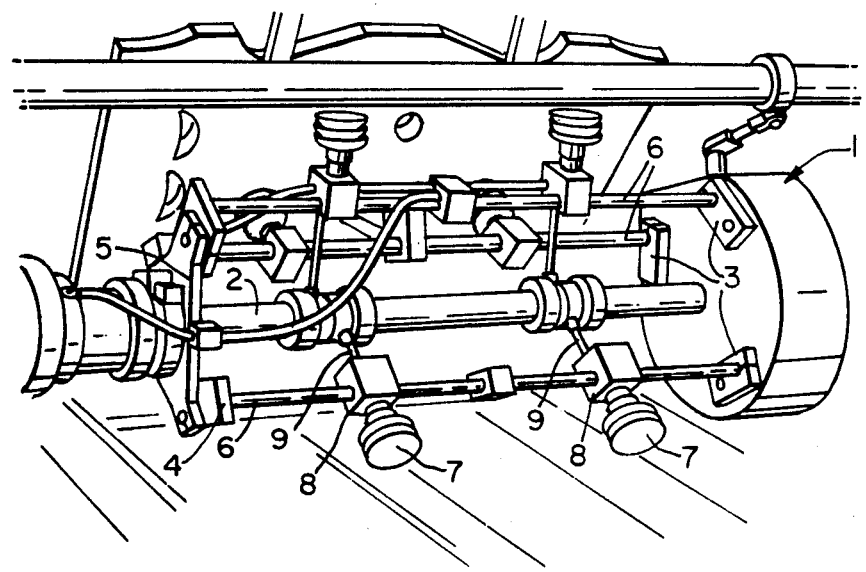

An embodiment of the invention will now be described, by way of example, with reference to the accompanying drawings, in which:

FIG. 1 is a perspective view of a cam assembly comprising a driven plate superposed on a cam plate, FIG. 2 is a perspective view of a part of the assembly with the driven plate removed from the cam plate and showing the cam tracks exposed, FIGS. 3 to 5 are schematic perspective views of the cam plate showing the cam arm and its associated roller followers in a series of sequential locations relative to the cam plate, FIG. 6 is a schematic side view of the cam arm and roller followers, FIG. 7 is a perspective view of the cam assembly with the cam arm in an extreme outwardly extended location, FIG. 8 is a perspective view of the cam assembly with the cam arm in an extreme inwardly retracted location, and FIG. 9 is a perspective view of a known feeder mechanism.

Referring first to FIG. 9, a known feeder mechanism comprises a cam assembly 1 which is actuated by a main driveshaft 2 in order to impart rotary motion to three spaced eccentric arms 3. Each eccentric arm is connected to similar eccentric arms 4 carried on a rotary plate 5 by means of a link shaft 6 extending parallel to the driveshaft. Rotary plate 5 is fixed for rotation with the driveshaft 2. Thus, three link shafts extend parallel to and outwardly of the driveshaft. Each link shaft carries a plurality of vacuum cups 7 mounted on bearing support blocks 8 fixed to the link shaft. Each support block is connected to the driveshaft by a connecting rod 9 which is slidably received in a bearing block 8a mounted on the driveshaft. As the driveshaft is rotated, the cam assembly imparts movement to the eccentric arms so that the link shafts together with their vacuum cup assemblies are moved inwardly and outwardly relative to the driveshaft whilst also being rotated about the driveshaft. The operation is more fully described in the aforesaid U.S. Pat. No. 3,575,409.

The cam assembly of the present invention is adapted to be used in conjunction with a similar feeder mechanism and replaces the cam assembly 1. For simplicity the cam assembly of the present invention is described with reference to only one eccentric arm, but in use would carry a plurality, e.g. three such arms for controlling the movement of three link shafts and their associated article pick-up elements, e.g. vacuum cups.

Referring now to FIGS. 1 and 2, there is shown a cam assembly 10 which forms a part of a feeder mechanism for withdrawing an item such as a paperboard blank from a hopper and for moving and depositing the blank at a point of application or use.

The cam assembly 10 comprises a driven plate 12 which is mounted on and rotated by a main driveshaft 14 relative to a cam plate 16. The driven plate and the cam plate are assembled in superposed relationship and one end of the driveshaft passes through the driven plate and is rotatably journalled in blind bore 18 formed in the cam plate 16 for rotation therein.

A cam shaft 20 is journalled by a rolling bearing 22 received in a bore 24 formed in the driven plate 12, the axis of the camshaft being parallel to that of the main driveshaft. One end of the camshaft is fixed to an elongate cam arm 26 so that the cam arm is connected to the cam shaft intermediate its ends for rotation therewith. One end of the cam arm carries a rotatable roller cam follower 28 and the opposite end of the cam arm carries a pair of coaxial rotatable roller cam followers 30 and 32 respectively.

The opposite end of the camshaft extends through the driven plate 12 and is fixed to one end of an eccentric arm 34. A link shaft 36 extends from the opposite end of the eccentric arm and carries a bearing block 38 which may be formed from a low friction material. The bearing block provides a support for an article pick-up element (not shown) such as a vacuum cup. Link shaft 36 is parallel to the main driveshaft 14.

A lost motion connecting rod 40 interconnects the link shaft 36 and the main driveshaft 14. One end of the connecting rod 40 is slidably received in a bearing block 42 rotatably mounted on the main driveshaft 14 and the other end of the connecting rod is fixed in the support block 38.

Thus, the cam arm and its associated followers are disposed relative to one face of the driven plate (which is juxtaposed the cam plate) whereas the eccentric arm, the connecting rod and the interconnected bearing blocks are disposed relative to the opposite face of the driven plate.

Referring now to FIGS. 3 to 5 and 6 of the drawings, in FIGS. 3 to 5 the cam plate 16 is shown schematically with the cam arm 26 and its associated followers in a series of sequential positions with respect thereto.

The cam plate has formed therein a continuous deep cam track 44 comprising a curvilinear shallow cam track 46 which comprises entry and exit portions 46a, 46b, respectively and continuation portion 46c. The entry and exit portion both have ends which are in open communication with the transverse portion 44b of the deep cam track 44 and the continuation portion 46c has one end in open communication with the transverse portion 44b aligned with exit portion 46b and its opposite end in open communication with the curvilinear portion 44a of the deep cam track remote from the entry and exit portions of the shallow cam track.

An outwardly protruding arcuate segment 44c interconnects the transverse and curvilinear portions of the deep cam track 44 and a similar arcuate segment 46d interconnects the entry and exit portions of the shallow cam track.

The cam arm 26 is located such that the single roller follower 28 rolls can roll in both the shallow cam track 46 and the deep cam track 44 whereas the twin roller follower 30, 32 can roll only in the deep cam track.

In FIG. 1 the cam arm is shown in a position in which both sets of roller followers at each end of the arm are within the deep cam track 44 and the bearing blocks 38 and 42 are at an intermediate position relative to one another. Thus, the vacuum cup (not shown) which is associated with bearing support block 38 would be disposed to a location intermediate its extreme positions relative to the main driveshaft 14.

In FIG. 3 the cam arm 26 is shown in a position in which the roller follower 28 is moving along entry portion 46a of the shallow cam track 46 towards the arcuate segment 46d. The path of movement described by the axes of the roller followers is indicated by the circle 'C' on which the projections of those axes is shown as points 28', 30', and the path of movement described by the axis of the camshaft is depicted by arcuate line 'A'.

As the driven plate is caused to be rotated (anti-clockwise as seen in the drawings) the cam arm is driven by cam shaft 20 and in the position shown in FIG. 3 roller follower 28 has moved into the entry portion 46a of shallow cam track 46 and twin roller follower 28/30 is about to enter the transverse portion of the deep cam track 44. When roller follower 28 moves into the arcuate segment 46d as depicted by FIG. 4 the eccentric arm is rotated into the position in which support block 38 is at an extreme position remote from the drive shaft 14. FIG. 7 shows the eccentric arm at a location immediately prior to this extreme position. This has the effect of moving the vacuum cap carried by the support block 38 from its intermediate position shown by the relative position of the parts in FIG. 1 to an outwardly extended position.

As the driven plate continues to rotate, the cam arm pivots momentarily about roller follower 28 located in the arcuate segment 46d while twin roller follower 30/32 moves through the transverse portion 44b of the deep cam track. When the cam arm 26 arrives in the location depicted by FIG. 5, in which roller follower 28 has commenced its travel along exit portion 46b of the shallow cam track and twin roller follower 30/32 approaches the arcuate recess 44c, the eccentric arm has moved through approximately 90° from its position at FIG. 4 so that once again the bearing blocks 38 and 42 are at an intermediate position relative to one another. Further rotation of the driven plate turns the cam arm 26 into a position in which the twin roller follower 30/32 moves into the arcuate segment 44c and the single roller follower 28 moves into the continuation portion 46c of the shallow cam track. When the single roller follower 28 reaches the end of continuation portion 46c the eccentric arm has moved through approximately 180° from its position at FIG. 4 so that the support block 38 is at an extreme position adjacent the driveshaft 14.

FIG. 8 shows the eccentric arm at this position at which the vacuum cup carried by the support block 38 is at an inwardly retracted position. Thus, when the single roller follower 28 is engaged in the arcuate segment 46d, the vacuum cup carried by support block 38 is in an outwardly extended position which it occupies for a predetermined time while the cam arm 26 executes a lost motion rotation about roller 28, and when the twin roller follower 30/32 is engaged in the arcuate segment 44c, the vacuum cup carried by support block 38 is in an inwardly retracted position which it occupies for a predetermined time while the cam arm 26 executes a lost motion rotation about twin rollers 30/32. During the lost motion rotations of the cam arm the connecting rod 40 remains stationary and the vacuum cup is activated and de-activated respectively to pick up and deposit an item e.g. a paperboard blank.

Upon further rotation of the driven plate the cam arm is driven so that both the single and twin roller followers move through the curvilinear portion 44a of the deep cam track as shown by FIG. 1 whereafter the sequence of events described above is repeated.

I claim:

1. A cam assembly for incorporation in an article feeder mechanism which assembly comprises a cam plate having formed therein a first continuous cam track and a second relatively shallower cam track, cam track follower means including a first follower for relative movement within only said first continuous track and a second follower for relative movement within the first and second cam tracks, drive means for moving said cam track followers with respect to said cam tracks, said cam track follower means being connected to article pick up means and each of said first and second cam tracks including arcuate portions engaged sequentially by respective ones of said first and second followers so that said article pick-up means is caused to move to an outwardly extended position and to an inwardly retracted position, respectively, relative to a central axis of said cam plate.

2. A cam assembly according to claim 1, wherein said drive means comprises a driveshaft connected to a driven plate means in superposed relationship with respect to said cam plate and wherein said cam track follower means is mounted for rotation with said driveplate remote from the axis of said driveshaft.

3. A cam assembly according to claim 2, wherein said cam track follower means is connected to one end of an eccentric arm mounted on face of said driven plate remote from said cam plate the opposite end of the eccentric arm being connected to a link shaft on which said article pickup means is carried.

4. A cam assembly according to claim 3, wherein said cam track follower means comprises a cam arm rotatably journalled intermediate its ends by a cam shaft extending through said driveplate and connected to said one end of the eccentric arm said first cam follower being located at one end of the cam arm and said second cam follower being located at the opposite end of the cam arm.

5. A cam assembly according to claim 4, wherein said link shaft is moved to an outwardly extended position remote from said driveshaft when said second cam follower is engaged in the arcuate portion of said second cam track and is moved to an inwardly retracted position adjacent said driveshaft when said first cam follower is engaged in the arcuate portion of said first cam track.

6. A cam assembly according to claim 5, wherein said cam arm executes a lost motion rotation when said cam followers are engaged in the arcuate portions of their respective cam tracks during which motion eccentric arm remains stationary whereby said article pickup means is maintained in its extended and retracted positions for a predetermined time during continuous rotation of said driven plate relative to said cam plate.

* * * * *